(12) United States Patent
Karl et al.

(10) Patent No.: US 10,047,874 B2
(45) Date of Patent: Aug. 14, 2018

(54) MAGNETIC VALVE

(75) Inventors: Andreas Karl, Neckar (DE); Reinhard Fink, Mannheim (DE); Dirk Foerch, Stein (DE)

(73) Assignee: Robert Bosch GmbH, Stuttgart (DE)

( * ) Notice: Subject to any disclaimer, the term of this patent is extended or adjusted under 35 U.S.C. 154(b) by 675 days.

(21) Appl. No.: 14/129,341

(22) PCT Filed: May 8, 2012

(86) PCT No.: PCT/EP2012/058447
§ 371 (c)(1),
(2), (4) Date: Dec. 26, 2013

(87) PCT Pub. No.: WO2013/000612
PCT Pub. Date: Jan. 3, 2013

(65) Prior Publication Data
US 2014/0110614 A1 Apr. 24, 2014

(30) Foreign Application Priority Data
Jun. 29, 2011 (DE) .................. 10 2011 078 314

(51) Int. Cl.
*F16K 31/06* (2006.01)
*B60T 8/36* (2006.01)

(52) U.S. Cl.
CPC .......... *F16K 31/0658* (2013.01); *B60T 8/363* (2013.01); *F16K 31/0665* (2013.01); *F16K 31/0644* (2013.01)

(58) Field of Classification Search
CPC .. F16K 31/02; F16K 31/0658; F16K 31/0655; F16K 31/0644
(Continued)

(56) References Cited

U.S. PATENT DOCUMENTS

| 8,740,185 | B2 * | 6/2014 | Guggenmos et al. | ... 251/129.15 |
| 2006/0081803 | A1 * | 4/2006 | Kawa et al. | ............. 251/129.15 |
| 2009/0121541 | A1 * | 5/2009 | Lee et al. | ................... 303/119.2 |

FOREIGN PATENT DOCUMENTS

| DE | 10 2008 024 101 A1 | 10/2009 |
| WO | 2008/058803 A1 | 5/2008 |

(Continued)

OTHER PUBLICATIONS

International Search Report corresponding to PCT Application No. PCT/EP2012/058447, dated Aug. 6, 2012 (German and English language document) (8 pages).

*Primary Examiner* — Kevin Murphy
*Assistant Examiner* — Kelsey Cary
(74) *Attorney, Agent, or Firm* — Maginot, Moore & Beck LLP

(57) ABSTRACT

A magnetic valve includes a valve component and a valve body that engages around a region of the valve component in a hood-like manner and in a sealing manner in at least one sealing region. A flow chamber is formed between the valve body and an end face of the valve component. The valve component has an axially running through-channel with a constant cross-section which passes through the end face and which opens into the flow chamber so as to form an axial duct for a fluid. The valve body has a through-opening that is fluidically connected to the flow chamber and is configured to be closed by a closing element that is movably arranged on a valve body face that faces away from the flow chamber. The end face is configured as a type of lip seal ring.

6 Claims, 3 Drawing Sheets

(58) Field of Classification Search
USPC .................. 251/129.02, 129.15, 361, 362
See application file for complete search history.

(56) References Cited

FOREIGN PATENT DOCUMENTS

| WO | 2008/155256 A1 | 12/2008 |
| WO | 2009/059844 A1 | 5/2009 |
| WO | 2010/040620 A1 | 4/2010 |

* cited by examiner

MAGNETIC VALVE

This application is a 35 U.S.C. § 371 National Stage Application of PCT/EP2012/058447, filed on May 8, 2012, which claims the benefit of priority to Serial No. DE 10 2011 078 314.8, filed on Jun. 29, 2011 in Germany, the disclosures of which are incorporated herein by reference in their entirety.

BACKGROUND

The disclosure relates to a magnetic valve having a valve component and a valve body that surrounds a region of the valve component in a hood-like manner and in a sealing manner in at least one sealing region, wherein a flow chamber is formed between the valve body and an end of the valve component, and, to form an axial passage for a fluid, the valve component has an axial through-channel which passes through the end and opens into the flow chamber, and the valve body has a through-opening that is fluidically connected to the flow chamber, wherein the through-opening can be closed by a closing element that is movably arranged on a side of the valve body which faces away from the flow chamber.

Magnetic valves of the type mentioned at the outset are known from the prior art. They are used in antilock brake systems (ABS) and/or electric stabilization programs (ESP) on motor vehicles, for example. A magnetic valve of this kind is used to adjust a volume flow of a fluid, in particular of a brake fluid. For this purpose, a passage in the magnetic valve forms an inlet or outlet for the fluid. The passage is formed by a valve component and a valve body, which surrounds the valve component in a hood-like manner. For this purpose, the valve component has a through-channel which opens into a flow chamber bounded by the valve component and the valve body. In order to ensure a good sealing effect for the passage, i.e. between the valve component and the valve body, the cross section of the through-channel is enlarged by a step formation in the region of the opening of said channel into the flow chamber, with the result that the valve component forms a relatively thin-walled channel wall in this region. Fluid flowing under high pressure through the passage, in particular the through-channel, exerts a force on the valve component. Owing to the thin construction of the channel wall, said wall is pressed against the valve body surrounding the valve component in the region of the channel wall. As a result, a good sealing effect is achieved between the valve component and the valve body and possible leakage from the passage of the magnet valve is prevented. Owing to the cross-sectional geometry of the passage, there can be unwanted flow behavior by the fluid and cyclical flow separations. Particularly at high rates of fluid flow through the magnetic valve, this leads to noise with an unwanted tonal component that is sometimes felt to be troublesome during operation.

SUMMARY

In the case of a magnetic valve of the type mentioned at the outset, provision is made, according to the disclosure, for the through-channel to have a constant cross section. The passage is formed by the through-channel made in the valve component, the flow chamber axially adjoining the latter, said chamber being surrounded by the valve component and the valve body, and the through-opening. The fluid is routed through the through-channel, the flow chamber and the flow opening one after the other in the direction of flow. By virtue of the constant cross section of the through-channel over the length thereof, flow behavior in the through-channel is uniform. The flow separations mentioned, which lead to the unwanted troublesome noise, as in the known magnetic valves, due to the stepped through-channel, therefore do not occur. By virtue of the constant cross section of the through-channel, the region of the passage in which it can have a different cross section is limited to the flow chamber, i.e. that region of the passage which lies between the outlet of the through-channel into the flow chamber and the through-opening, the latter preferably being formed as an axial extension of the through-channel. As a result and, in particular, as a result of the small distance, made possible by the disclosure, between the outlet and the through-opening, the tonal component of any possible noise due to the behavior of the flow in the passage is shifted to a range above 12 kHz, which does not trouble the human sense of hearing. The distance between the outlet and the through-opening is preferably less than the dimension of largest cross section or than the diameter of the through-channel. The cross section of the through-channel is preferably of circular design. The term "constant" cross section of the through-channel should also be taken to include cross-sectional dimensions which exhibit small deviations from the constant cross-sectional dimension due, for example, to manufacturing tolerances.

A channel inlet of essentially any desired cross section can be provided ahead of the through-channel in the direction of flow. The cross section can vary in the direction of flow. For example, the channel inlet may be in the form of a diffuser, the cross section of which decreases in the direction of flow. When viewed in the direction of flow, the longitudinal extent of the channel inlet is smaller than that of the through-channel in order to ensure that the uniform flow behavior described is achieved. In particular, the longitudinal extent of the channel inlet is no more than 20%, preferably 10%, of the longitudinal extent of the through-channel or no more than the dimension of largest cross section or than the diameter of the through-channel. The outlet of the through-channel is situated at the furthest position of the valve component downstream in the direction of flow.

According to a development of the disclosure, provision is made for the valve component to have a sealing device which is arranged at a radial distance from the through-channel and acts on the sealing region. The sealing device achieves a good sealing effect in the sealing region between the valve component and the valve body and thus ensures a passage of leak-free construction. Owing to the constant cross section of the through-channel over the length thereof, the sealing device is formed at a radial distance therefrom. Thus, the through-channel and the sealing device are spatially separate. The sealing device is preferably of integral construction with the valve component.

A development of the disclosure provides for the sealing device to be designed as at least one material zone of the valve component which can be deformed by pressure of the fluid. By means of the deformability of the material zone, an enhanced sealing effect in the sealing region is achieved. Owing to the high pressure of the fluid flowing through the passage, the fluid exerts a force on the material zone, which causes deformation thereof, in particular plastic or elastic deformation. For this purpose, the material zone is preferably of such thin construction that the stiffness of the material is reduced in this region. Preferably, the valve component and thus the material zone are made of plastic. It is advantageous if the material zone delimits the flow chamber over a certain area, with the result that the material zone is deformed by the pressure of the fluid in the flow chamber.

Provision is preferably made for the sealing region formed by the valve component and the valve body to be formed by an outer region of the material zone and by an inner region of the valve body. Since the valve body surrounds the valve component over a certain area, the outer region of the material zone and the inner region of the valve body rest against one another and thereby seal the passage of the magnetic valve in a leak-free manner. Owing to the preferred deformability of the material zone, said zone is pressed by the pressure of the fluid against the valve body, in particular the inner region thereof, surrounding the valve component, in particular the material zone. This preferably takes place substantially in a radial direction. An enhanced sealing effect of the sealing region is thereby achieved.

It is advantageous if the material zone is designed as an outer web, in particular as an outer annular web, of the valve component. Thus, the outer web runs around the circumference of the valve component. By means of the design of the material zone as an outer web, a relatively thin-walled material zone is formed, which can preferably be deformed by the pressure of the fluid. The height of the outer web preferably extends in the axial direction. The outer web can be designed as a continuous annular web, in particular a circular annular web, or as an interrupted or discontinuous web which has a plurality of web segments. In the present application, the term "web" should be taken to mean a three-dimensional geometrical body, the length dimension of which is greater than the width dimension and, in particular, the height dimension.

In an advantageous development of the disclosure, provision is made for an axial depression, in particular groove, bounding the material zone and opening into the flow chamber to be formed on the end of the valve component. When the fluid flows through the passage, there is also fluid in the depression. The pressure of the fluid expands the depression radially outward, and deforms the material zone in a corresponding manner, in particular in the radial direction. This results in the aforementioned good sealing effect of the sealing region. By means of the axial depression, the material zone is preferably constructed in the form of the outer web. In a preferred embodiment, the depression can be formed by a plurality of depression segments spaced apart in the circumferential direction.

In an advantageous development of the disclosure, provision is made for the depression to be designed as a ring-shaped, in particular circular-ring-shaped, depression running around the through-channel at a radial distance from the latter. The ring-shaped depression is designed to be continuous and to completely surround the through-channel circumferentially, with the depression always being at a distance from the through-channel. In a preferred embodiment, provision is furthermore made for the ring-shaped depression to create the relatively thin-walled material zone along the entire circumference of the valve component. The radial distance between the depression and the sealing region is preferably constant over the entire circumference of the valve component so as to achieve a constant sealing effect at any point of the sealing region.

It is furthermore advantageous if the valve component has an inner web, in particular an inner annular web, formed between the through-channel and the depression. The inner web can be constructed so as to be interrupted, i.e. so as to have a plurality of web segments, and, to this extent, delimits the through-channel segmentally along its circumference in the region of its outlet into the flow chamber. The inner annular web is of continuous construction and fully delimits said region.

According to another embodiment of the disclosure, provision is made for the valve component to have the through-channel, the inner web, the depression and the outer web one behind the other - when viewed radially from the inside outward.

Provision is preferably made for the height of the inner web and that of the outer web to be the same—when viewed in the axial direction. In a preferred embodiment of the valve component, the ends of the inner and outer web lie in a plane extending perpendicularly to the axial direction. As a result, the inner and outer webs have the same height, that is to say, in particular, have the same extent in the direction of flow. The heights can also differ slightly from one another due to manufacture.

It is furthermore advantageous if the valve component is arranged so as to be pressed locally into the valve body. By means of this pressed-in arrangement, a certain sealing is already achieved between the valve body and the valve component. Moreover, simple, mechanized assembly is thereby made possible.

It is furthermore advantageous if the valve body is composed of deep drawn or turned steel.

BRIEF DESCRIPTION OF THE DRAWINGS

The drawings illustrate the disclosure by means of various embodiments, and, in the drawings.

DETAILED DESCRIPTION

Figure 1:
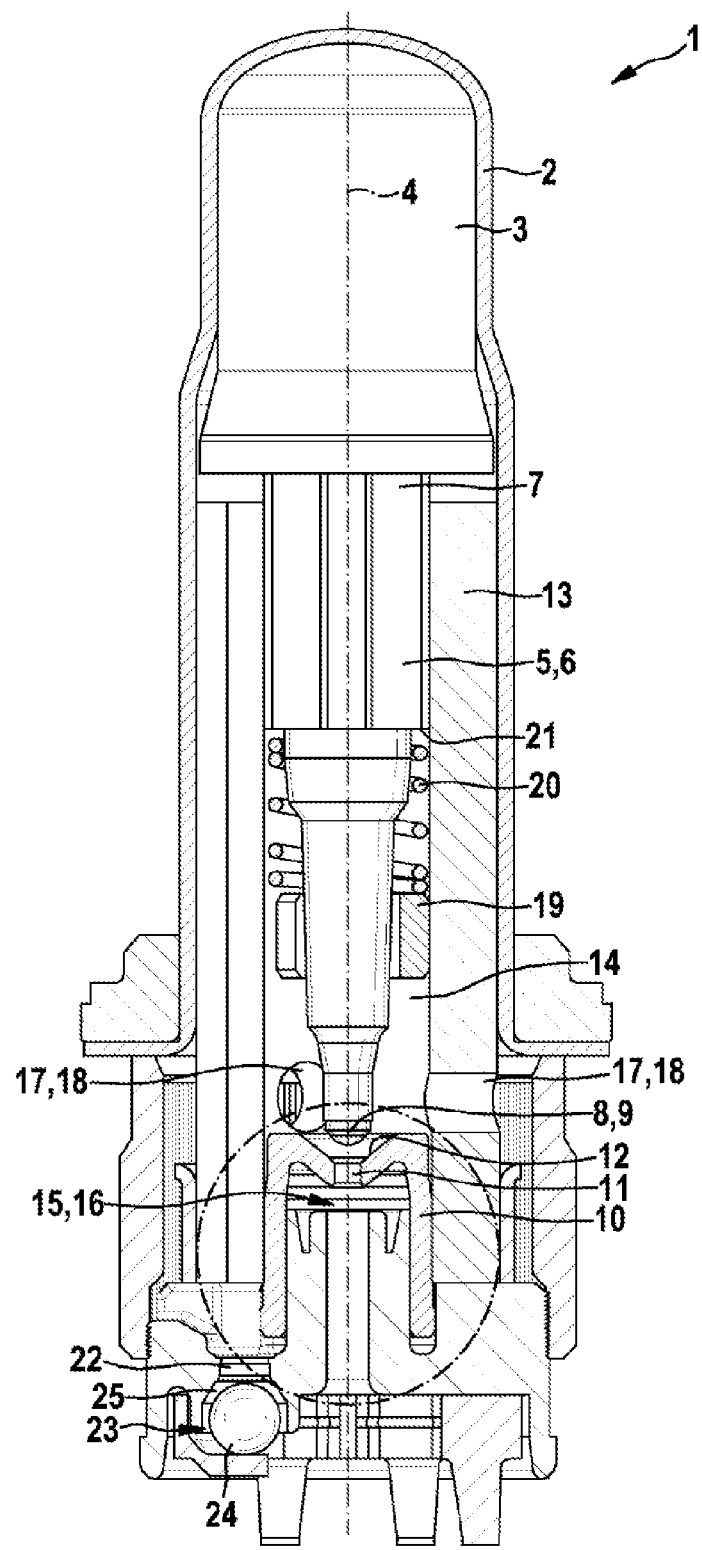
FIG. 1 shows a schematic longitudinal section through a magnetic valve according to a first embodiment.

FIG. 1 shows a schematic longitudinal section through a magnetic valve 1 according to a first embodiment. The magnetic valve 1 has a sleeve 2, in which a piston-type magnet armature 3 is arranged so as to be movable along a longitudinal axis 4 of the magnetic valve 1. A closing element 6 designed as a tappet 5 is operatively connected, at one end 7 thereof, to the magnet armature 3. The free end 8 of the closing element 6, the opposite end from the magnet armature 3, is designed as sealing geometry 9, which is shaped in the manner of a spherical cap. In a closed position of the magnetic valve 1, the sealing geometry 9 interacts with a funnel-shaped valve seat 12 formed in a valve body 10 and having a through-opening 11. The magnetic valve 1 furthermore has a valve insert 13 substantially in the form of a hollow cylinder, which is surrounded over a certain area by the sleeve 2. The sleeve 2, the valve insert 13 and the valve body 10, which is arranged over a certain area in the valve insert 13, delimit a valve chamber 14 for a fluid. The valve chamber 14 is connected fluidically to a passage 15, which is designed as an inlet 16 for the fluid and is partially formed by the through-opening 11 in the valve body 10. The passage 15 extends in the axial direction along the longitudinal axis 4 of the magnetic valve 1. Further details of the passage 15 will be given below.

The valve chamber 14 is furthermore connected fluidically to it least one, but generally to a plurality of, radial channels 17, wherein two such radial channels 17 can be seen in the sectioned view in FIG. 1. The radial channels 17 form an outlet 18 for the fluid and are formed in the valve insert 13 perpendicularly to the longitudinal axis 4. Also arranged in the valve chamber 14 is a spring support 19, which is pressed into the valve insert 13 and surrounds the closing element 6 in a ring shape, at least over a certain area. A spring element 20 is supported at one end on the spring support 19 and, at the other end, on a shoulder 21 of the closing element 6. The magnetic valve 1 furthermore has a bypass channel 22, which connects the valve chamber 14 and the passage 15 fluidically. A check valve 23, which has a spherical check valve closing body 24 and a check valve seat 25, is provided in the bypass channel 22.

If, during the operation of the magnetic valve 1, a magnet coil—not shown in FIG. 1—surrounding the sleeve 2 in the region of the magnet armature 3 is energized, the magnet armature 3 and the closing element 6 move along the longitudinal axis 4 in the direction of the valve seat 12, against a restoring force of the spring element 20. As a result, the sealing geometry 9 is pressed into the valve seat 12, and the connection between the passage 15 and the valve chamber 14 is closed. During this process, the bypass channel 22 is closed by the check valve 23 since the check valve closing body 24 is pressed into the check valve seat 25 by the pressure of the fluid in the passage 15 acting upon it. Thus, the fluid in the passage 15 cannot flow into the valve chamber 14 of the magnetic valve 1. The magnetic valve 1 is therefore in a closed position. If the magnet coil is not energized, the sealing geometry 9 is in a position raised from the valve seat 12 since the spring element 20 supported on the spring support 19 pushes the closing element 6 and the magnet armature 3 upward along the longitudinal axis 4. The fluid thus flows through the passage 15 into the valve chamber 14 and leaves the latter through the radial channels 17. Thus, the magnetic valve 1 is in an open position. In particular, the magnetic valve 1 is a magnetic valve 1 which is open when deenergized.

Depending on the intensity of energization of the magnet coil, partial opening of the passage 15 is also possible. If the fluid flows counter to the direction of flow described above, the check valve 23 is opened owing to the pressure of the fluid in the valve chamber 14, i.e. the check valve closing body 24 is raised from the check valve seat 25, with the result that fluid flows from the valve chamber 14 into the passage 15 through the bypass channel 22.

Figure 2:
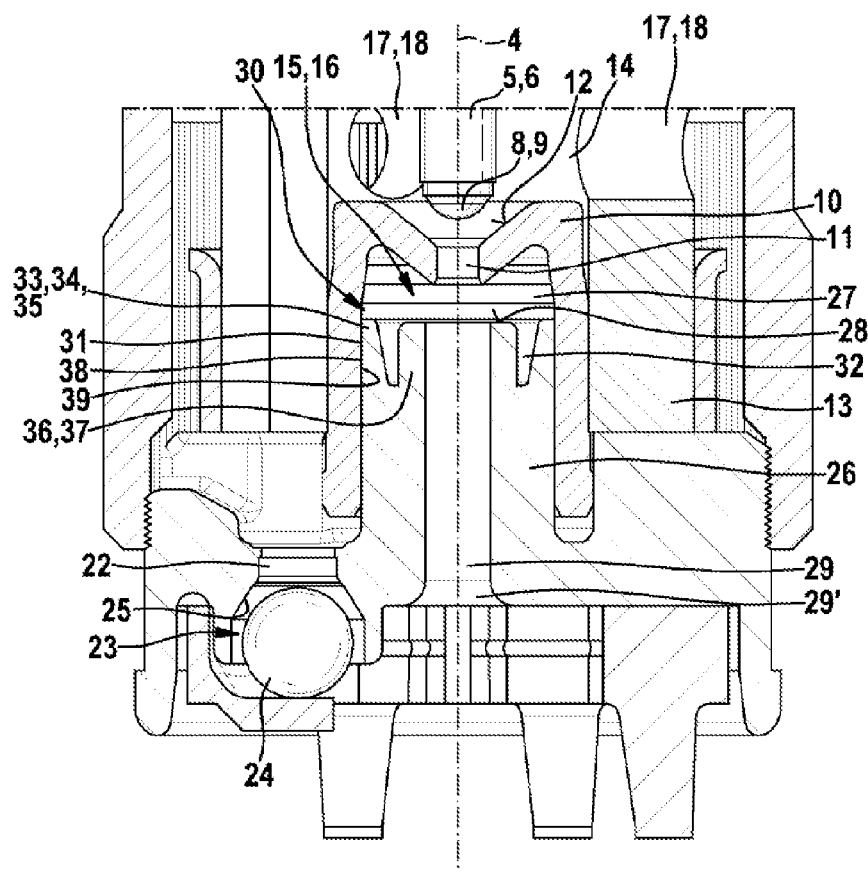
FIG. 2 shows a schematic longitudinal section through a region of the magnetic valve shown in FIG. 1.

The region of the magnetic valve 1 which is indicated in FIG. 1 is shown on an enlarged scale in FIG. 2. Identical reference signs denote the same components of the magnetic valve 1, and therefore attention is drawn in this respect to the associated text of the description. In FIG. 2, the valve body 10 can be seen, said valve body preferably being made from deep drawn steel and/or in the form of a sleeve. The valve seat 12 is formed on that side of the valve body 10 which faces the valve chamber 14. The valve body 10 surrounds a valve component 26, at least over a certain area, said valve component preferably being made of plastic. The valve component 26 is preferably pressed into the valve body 10 over a certain area. The valve component 26 and the valve body 10 delimit a flow chamber 27, the latter being situated, in particular, between an end 28 of the valve component 26 and the valve body 10. In this case, the end 28 is flat and is preferably formed perpendicularly to the longitudinal axis 4. The valve component 26 has a through-channel 29 extending along the longitudinal axis 4 and having a cross section which remains constant over its length and is, in particular, circular. The through-channel 29 passes through the end 28 and opens into the flow chamber 27. A channel inlet 29' is furthermore formed in the valve component 26. The channel inlet 29' axially adjoins that end of the through-channel 29 which faces away from the flow chamber 27. The channel inlet 29' preferably likewise has a circular cross section. Starting from the transition of the through-channel 29 into the channel inlet 29', at which the cross sections thereof are identical, the cross section of the channel inlet 29' becomes continuously larger. The channel inlet 29' thus forms a diffuser. The channel inlet 29' is designed to be shorter in the axial direction, preferably many times shorter, than the through-channel 29. The channel inlet 29', the through-channel 29, the flow chamber 27 and the through-opening 11, which are situated substantially one behind the other—when viewed looking upward in the axial direction—form the passage 15 of the magnetic valve 1, which opens into the valve chamber 14. In this case, the through-opening 11, which has a smaller cross section than the through-channel 29, is coaxial with the through-channel 29. The bypass channel 22 and the check valve seat 25 are formed in the valve component 26.

The valve component 26 has a sealing device 30. This is formed integrally with the valve component 26, i.e. is made of the material of the valve component 26. The sealing device 30 has a sealing effect on a sealing region 31 which seals off the passage 15 of the magnetic valve 1 in a leak-free manner and is formed by the valve component 26 and the valve body 10. The sealing device 30 is formed by an axial depression 32 present on the end 28 of the valve component 26 and opening into the flow chamber 27. The depression 32 surrounds the through-channel 29 in a ring shape and, at the same time, is spaced apart therefrom in the radial direction. That region of the valve component 26 which lies radially to the outside of the depression 32 forms a material zone 33, which is formed as an outer web 34, in particular an outer annular web 35, of the valve component 26. That region of the valve component 26 which lies between the through-channel 29 and the depression 32 forms an inner web 36, in particular an inner annular web 37, of the valve component 26. In the axial direction, the outer annular web 35 and the inner annular web 37 have the same height and, accordingly, the end faces thereof are flush with one another in the radial direction. In a longitudinal section, the inner annular web 37 has a substantially rectangular shape. The outer annular web 35 has a substantially trapezoidal longitudinal section, wherein the radial width thereof decreases in the direction of the through-opening 11. This means that the outer annular web 35 is thinnest, i.e. has a minimum width, in the region of the end 28 of the valve component 26. The outer annular web 35 forms the sealing device 30. The sealing region 31 formed between the valve component 26 and the valve body 10 is formed by an outer region 38 of the material zone 33 and an inner region 39 of the valve body 10.

Figure 3:
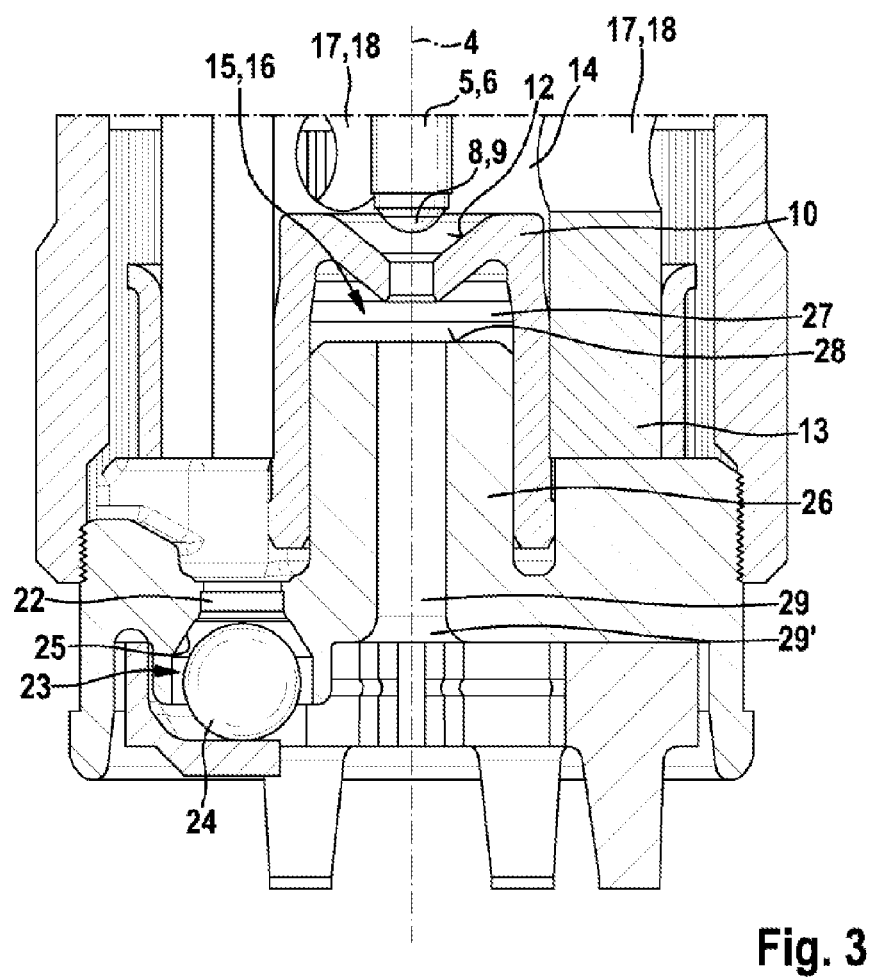
FIG. 3 shows a schematic longitudinal section through a region of a magnetic valve in accordance with a second embodiment.

A region of a magnetic valve 1 in accordance with a second embodiment is shown in FIG. 3. Identical reference signs denote identical components, and therefore attention is drawn to this extent to the statements made above. The magnetic valve 1 shown by means of FIG. 3 corresponds to that shown in FIG. 2 but no sealing device 30 and thus no depression 32 are provided in the valve component 26.

The following operation of the magnetic valve 1 is obtained: the fluid which flows through the passage 15 into the valve chamber 14 in the opened state of the magnetic valve 1 is characterized by uniform flow behavior in the through-channel 29. This is attributable to the constant cross section thereof along the entire axial length thereof, as a result of which an at least partially formed flow profile is established until the outlet of the through-channel 29 is reached. As a result, there are no disadvantageous flow effects or flow separations, which could generate unwanted noise effects. Owing to the provision of the channel inlet 29' formed axially ahead of the through-channel 29 and having a cross section which decreases in the direction of flow, unwanted flow effects are minimized, even as the fluid enters the through-channel 29. Between the outlet of the through-channel 29 into the flow chamber 27 and the through-opening 11 situated opposite said outlet, i.e. in the flow chamber 27, the passage 15 has a larger and changing cross section. Insofar as there are deviations from the uniform flow behavior in this region of the passage 15, e.g. due to differences in the speed of the fluid in the flow chamber 27 and of the fluid entering the flow chamber 27 from the through-channel 29, only a high-frequency noise imperceptible to human hearing is generated since the axial extent of this region, i.e. of the flow chamber 27, is short, in particular shorter than the dimension of largest cross section or the diameter of the through-channel 29.

Moreover, a well-sealed passage 15 is obtained according to the first embodiment in FIGS. 1 and 2. The fluid flowing through the passage 15 also enters the depression 32 opening into the flow chamber 27 and thus exerts a force, in particular a force with a radial component, on the web 34. The web is pressed radially outward against the valve body 10 surrounding the valve component 26, thereby ensuring leak-free routing of the fluid through the passage 15. By virtue of the trapezoidal longitudinal section of the web 34, said web is thinnest in the region of the end 28 of the valve component 26, and therefore the best sealing effect is obtained in this region because the material of the web 34 opposes the force acting radially outward caused by the fluid with a correspondingly low elastic force. The formation of the depression 32 and hence of the sealing device 30 furthermore makes the structure less sensitive to manufacturing tolerances in terms of the sealing effect. In the absence of a depression 32 as shown in the embodiment in FIG. 3, higher assembly forces as the valve component 26 is pressed into the valve body 10 are required for certain manufacturing tolerances since the valve component 26 is more rigid than that where there is a depression 32.

The invention claimed is:

1. A magnetic valve, comprising:
a valve component having an upper end portion;
a valve body surrounding the upper end portion of the valve component in a hood-like manner and in a sealing manner in at least one sealing region; and
a flow chamber defined by the valve body and the upper end portion of the valve component,
wherein the valve component has an axial through-channel which passes through the upper end portion and opens into the flow chamber to form an axial passage for a fluid, the through-channel having a constant cross section,
wherein the valve body has a through-opening that is fluidically connected to the flow chamber, the through-opening configured to be closed by a closing element that is movably arranged on a side of the valve body which faces away from the flow chamber, and
wherein the valve component includes a depression formed in the upper end portion, the depression spaced apart a first radial distance from the through-channel and spaced apart a second radial distance from the at least one sealing region.

2. The magnetic valve of claim 1, wherein:
the valve component has a lower end portion arranged opposite the upper end portion, and
a rigidity of the valve component at the upper end portion is less than at the lower end portion due to the depression.

3. The magnetic valve of claim 1, wherein the depression is positioned radially inwardly of the at least one sealing region.

4. The magnetic valve of claim 1, wherein the depression is positioned radially between the through-channel and the at least one sealing region.

5. The magnetic valve of claim 1, wherein the depression is a groove that opens directly into the flow chamber.

6. The magnetic valve of claim 1, wherein the depression is a circular groove.

* * * * *